United States Patent
Forty et al.

(10) Patent No.: US 9,545,844 B2
(45) Date of Patent: Jan. 17, 2017

(54) MOTOR VEHICLE WITH IMPROVED AIR INTAKE APPARATUS

(71) Applicant: Jaguar Land Rover Limited, Whitley Coventry Warwickshire (GB)

(72) Inventors: Roger Forty, Kenilworth (GB); David White, Birmingham (GB); Michael Powell, Rugby (GB); Simon Smith, Coventry (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/372,880

(22) PCT Filed: Jan. 21, 2013

(86) PCT No.: PCT/EP2013/051029
§ 371 (c)(1),
(2) Date: Jul. 17, 2014

(87) PCT Pub. No.: WO2013/107903
PCT Pub. Date: Jul. 25, 2013

(65) Prior Publication Data
US 2015/0202955 A1    Jul. 23, 2015

(30) Foreign Application Priority Data
Jan. 20, 2012 (GB) .................................. 1200938.7

(51) Int. Cl.
*B60K 13/02* (2006.01)
*B60K 13/06* (2006.01)
(Continued)

(52) U.S. Cl.
CPC .............. *B60K 13/02* (2013.01); *B60K 13/06* (2013.01); *B60R 13/06* (2013.01); *B60R 13/0846* (2013.01); *F02M 35/161* (2013.01)

(58) Field of Classification Search
CPC .... F02M 35/10013; B60K 13/02; B60K 13/06
(Continued)

(56) References Cited

U.S. PATENT DOCUMENTS 2,881,860 A   4/1959 Ternes
3,641,746 A   2/1972 Smith et al.
(Continued)

FOREIGN PATENT DOCUMENTS

DE   8715030 U1   1/1988
EP   0111430 A1   6/1984
(Continued)

OTHER PUBLICATIONS

International Search Report for application No. PCT/EP2013/051029, dated May 28, 2013, 5 pages.
(Continued)

*Primary Examiner* — Bryan Evans
(74) *Attorney, Agent, or Firm* — Reising Ethington P.C.

(57) ABSTRACT

A motor vehicle comprises a vehicle body, an engine compartment housing an engine, a bonnet movably coupled to the body and arranged to provide a closure member for the engine compartment, the bonnet being movable between open and closed conditions to allow access to the engine compartment, and an engine air intake duct having an orifice through which intake air may be drawn into the engine. The vehicle is provided with first and second air flaw paths whereby air may be supplied to the air intake duct. The first flow path comprises an air inlet aperture disposed at a front portion of the vehicle for receiving ram air and an air outlet aperture aft of the air inlet aperture, the air outlet aperture being provided in fluid communication with the air intake duct orifice. The second flow path is provided by a gap
(Continued)

between a side edge of the bonnet and the body of the vehicle, whereby ambient air may be drawn through the gap to the air intake duct.

27 Claims, 6 Drawing Sheets

(51) Int. Cl.
 *F02M 35/16* (2006.01)
 *B60R 13/06* (2006.01)
 *B60R 13/08* (2006.01)
(58) Field of Classification Search
 USPC .......................................................... 180/68.3
 See application file for complete search history.

(56) References Cited

U.S. PATENT DOCUMENTS

| | | | | |
|---|---|---|---|---|
| 5,134,977 | A | * | 8/1992 | Bagger et al. ............. 123/198 E |
| 5,195,484 | A | | 3/1993 | Knapp |
| 5,199,522 | A | | 4/1993 | Martenas et al. |
| 5,901,672 | A | | 5/1999 | Suzuki et al. |
| 6,035,955 | A | | 3/2000 | Suzuki et al. |
| 6,425,930 | B1 | * | 7/2002 | Wake et al. ................... 55/385.3 |
| 2003/0213220 | A1 | | 11/2003 | Hornung |
| 2006/0006012 | A1 | | 1/2006 | Khouw et al. |
| 2008/0099261 | A1 | | 5/2008 | Sturmon et al. |
| 2010/0083928 | A1 | * | 4/2010 | Saito et al. ............... 123/184.56 |

FOREIGN PATENT DOCUMENTS

| | | |
|---|---|---|
| FR | 2886892 A1 | 12/2006 |
| JP | S62110024 U | 7/1987 |
| JP | H0221122 U | 2/1990 |
| JP | H049329 U | 1/1992 |
| JP | H09136551 A | 5/1997 |
| JP | 2006160142 A | 6/2006 |
| JP | 2010048234 A | 3/2010 |

OTHER PUBLICATIONS

Great Britain Search Report for application No. GB1301004.6, dated Jun. 14, 2013, 5 pages.
Combined Search and Examination Report corresponding to GB application No. 1200938.7, dated May 21, 2012, 5 pages.
Japanese Office action corresponding to JP application No. 2014-552649, dated Sep. 8, 2015, 3 pages.
Chinese Office Action in Chinese with English translation for CN application No. 201380006001.0, dated Aug. 24, 2016, 21 pages.

* cited by examiner

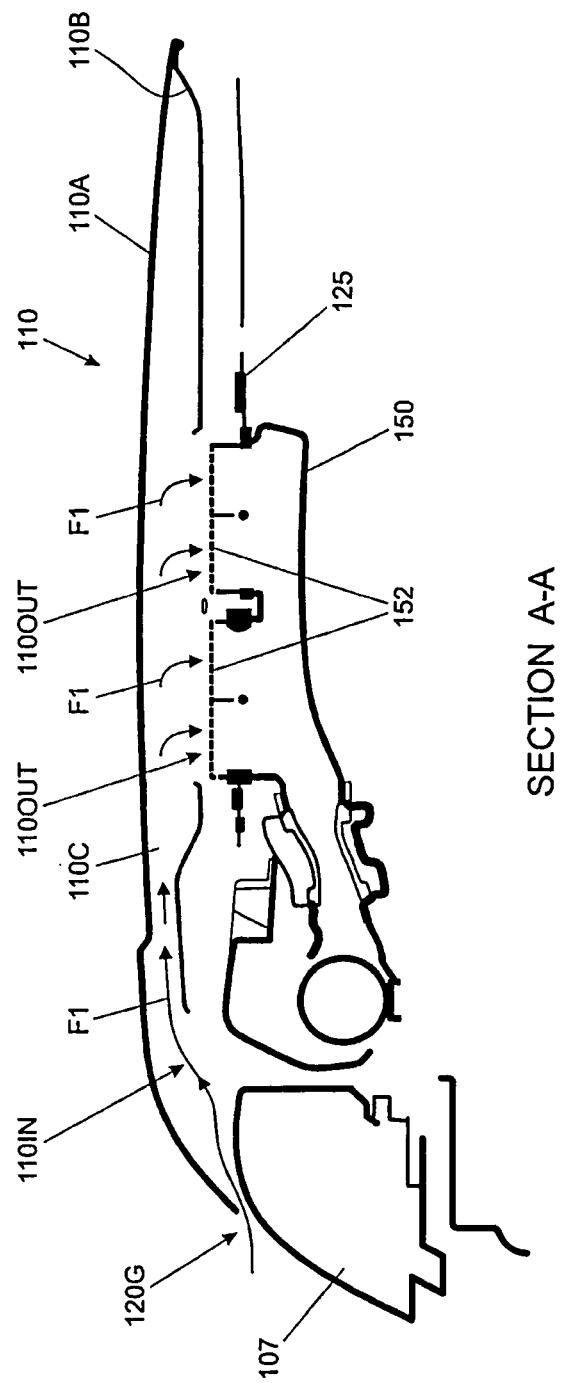

MOTOR VEHICLE WITH IMPROVED AIR INTAKE APPARATUS

FIELD OF THE INVENTION

The present invention relates to motor vehicles and in particular to a motor vehicle air intake arrangement. Aspects of the invention relate to a motor vehicle and to a method of providing intake air to an engine of a motor vehicle.

BACKGROUND

It is known to provide a motor vehicle having an engine air intake conduit arranged to drawn air from an engine compartment of the vehicle. It is also known to provide a motor vehicle having an engine air intake conduit arranged to draw air through a grille provided in a front-facing panel of the vehicle.

SUMMARY OF THE INVENTION

Embodiments of the invention may be understood by reference to the appended claims.

Aspects of the invention provide a motor vehicle and a method as claimed in the appended claims.

In another aspect, the present invention provides a motor vehicle comprising:
 a vehicle body;
 an engine compartment housing an engine;
 a bonnet movably coupled to the body and arranged to provide a closure member for the engine compartment, the bonnet being movable between open and closed conditions to allow access to the engine compartment; and
 an engine air intake duct having an orifice through which intake air may be drawn into the engine,
 wherein the vehicle is provided with first and second air flow paths whereby air may be supplied to the air intake duct,
 the first flow path comprising an air inlet aperture disposed at a front portion of the vehicle for receiving ram air and an air outlet aperture aft of the air inlet aperture, the air outlet aperture being provided in fluid communication with the air intake duct orifice;
 the second flow path being provided by a gap between a side edge of the bonnet and the body of the vehicle, whereby ambient air may be drawn through the gap to the air intake duct.

Embodiments of the invention have the advantage that an adequate supply of engine intake air may be provided to the engine of the vehicle without a requirement to provide an additional opening in one or more panels of the body of the vehicle such as the bonnet, a wing panel or a front bumper fascia. This is because during normal operations engine intake air such as ram air may be drawn from a front of the vehicle along the first flow path.

If the first flow path becomes blocked, for example during a wading operation where the air inlet aperture of the first flow path becomes submerged, intake air may be drawn along the second flow path through the gap between the bonnet and body of the vehicle such as a gap between the bonnet and a wing panel. Thus a risk that liquid is drawn from the front of the vehicle along the first flow path to the engine air intake orifice is reduced.

The first flow path may be provided by a bonnet air intake conduit, the air inlet aperture being provided at a front portion of the bonnet. This arrangement is advantageous because it enables the air inlet aperture to be positioned as high up on the front of the vehicle as possible which is beneficial in maximising the wade depth of the vehicle, i.e. the maximum depth of water through which the vehicle can be driven.

The second flow path may pass through the air intake duct orifice into the air intake duct. Alternatively the second flow path may pass through an alternative opening in the air intake duct.

Advantageously the air inlet of the bonnet air intake conduit may be arranged to draw air passing through a gap between the bonnet and a front portion of the body of the vehicle.

Advantageously the air inlet of the bonnet air intake conduit may be arranged to draw air passing through a gap between the bonnet and a front lighting cluster of the body of the vehicle.

Advantageously the vehicle may be provided with a front grille for receiving ram air during travel in a forward direction, the air inlet of the bonnet air intake conduit being in fluid communication with air received through the front grille.

Advantageously the vehicle may be arranged to divert at least a portion of ram air passing through the front grille upwards into the air inlet of the bonnet air intake conduit.

For example, a portion of the front grille such as an upper portion may be shaped so as to direct air upwards into the air inlet of the bonnet air intake conduit. A topmost portion of the grille may be so shaped in some embodiments.

Further advantageously the air intake orifice of the engine air intake duct may be arranged to face in a substantially upward direction thereby to receive air flowing downwardly from the bonnet air intake conduit, a leak path being provided between the bonnet air intake conduit outlet aperture and the air intake orifice thereby to allow air flowing along the second flow path to pass through the air intake orifice.

Advantageously the engine air intake orifice may be defined by an engine air intake orifice member, the intake orifice member being arranged wherein air flowing along the second flow path that has passed through the gap between the side edge of the bonnet and the body of the vehicle is required to rise upwardly before being drawn through the orifice.

This feature has the advantage of reducing a risk that particles entrained in a flow of intake air are drawn through the intake orifice. For example, it is found that the number of particles of snow or of water droplets entrained in intake air drawn through the gap that subsequently pass through the intake orifice is substantially reduced if the air is forced to rise upwardly before being drawn through the orifice.

It is to be understood that the intake orifice member may protrude upwardly above a surrounding portion of the vehicle to which it is mounted, which may for example be a wing panel member or a fender panel member.

Further advantageously the intake orifice member may be arranged to protrude upwardly into the bonnet air conduit outlet aperture whereby air flowing along the second flow path is required to pass through the bonnet air conduit outlet aperture before entering the intake orifice member.

This feature has the advantage of further reducing a risk that particles entrained in a flow of intake air are drawn through the intake orifice.

Advantageously the engine air intake orifice may be provided in fluid isolation from the engine compartment.

Thus air in the engine compartment is prevented from entering the air intake duct. This feature has the advantage that air that has been warmed by the engine cannot enter the air intake duct, ensuring that only relatively cool air enters the intake duct.

Advantageously seal means may be provided at location between the air intake orifice and the engine compartment thereby to prevent flow of air from the engine compartment to the air intake orifice.

Advantageously the bonnet air intake conduit may be defined by respective external and internal panels of the bonnet, the external and internal panels being coupled together thereby to define the conduit therebetween.

The internal panel may for example be arranged to provide structural strength to the bonnet.

Further advantageously the air inlet of the bonnet air intake conduit and/or the air outlet of the bonnet air intake conduit may be defined by the internal panel.

Advantageously the vehicle may comprise a resonator arrangement for absorbing acoustic energy generated as air flows along the first flow path through the bonnet air conduit.

Advantageously the resonator arrangement may comprise a Helmholtz resonator.

The bonnet may comprise the resonator arrangement.

Further advantageously the resonator arrangement may be defined by one or both of the infernal and external panels of the bonnet.

Advantageously the vehicle may comprise a pair of air intake duct orifices located on respective opposite sides of the engine compartment, the bonnet providing a corresponding pair of bonnet air intake conduits.

The bonnet may be a clamshell bonnet.

In another aspect of the invention for which protection is sought there is provided a motor vehicle comprising:
  a vehicle body;
  an engine compartment housing an engine;
  a bonnet movably coupled to the body and arranged to provide a closure member for the engine compartment, the bonnet being movable between open and closed conditions to allow access to the engine compartment; and
  an engine air intake duct having an orifice through which intake air may be drawn into the engine,
  wherein the vehicle is provided with first and second air flow paths whereby air may be supplied to the air intake duct,
  the first flow path being provided by a bonnet air intake conduit, the bonnet air intake conduit having an air inlet aperture at a front portion of the bonnet and an air outlet aperture aft of the air inlet aperture, the air outlet aperture being provided in fluid communication with the air intake duct orifice,
  the second flow path being provided by a gap between a side edge of the bonnet and the body of the vehicle, whereby ambient air may be drawn through the gap to the air intake duct.

In another aspect of the invention for which protection is sought there is provided a method of providing intake air to an engine of a motor vehicle comprising:
  drawing air into an engine via an orifice of an air intake duct along first and second flow paths,
  whereby air flowing along the first flow path flows through an air intake conduit of a bonnet of the vehicle, the bonnet air intake conduit having an air inlet aperture at a front portion of the bonnet and an air outlet aperture aft of the air inlet aperture through which the air is drawn, the air outlet aperture being in fluid communication with the air intake duct orifice, and whereby fluid flowing along the second flow path is arranged to flow through a gap between a side edge of the bonnet and the body of the vehicle, whereby ambient air may be drawn through the gap to the air intake duct.

In another aspect, the invention provides a motor vehicle comprising:
  a vehicle body;
  an engine compartment housing an engine;
  a bonnet movably coupled to the body and arranged to provide a closure member for the engine compartment, the bonnet being movable between open and closed conditions to allow access to the engine compartment; and
  an engine air intake duct having an orifice through which intake air may be drawn into the engine,
  wherein the vehicle is provided with first and second air flow paths whereby air may be supplied to the air intake duct,
  the first flow path comprising a first air inlet aperture disposed at a front portion of the vehicle for receiving ram air and a first air outlet aperture aft of the first air inlet aperture, the first air outlet aperture being provided in fluid communication with the air intake duct orifice;
  the second flow path comprising a second air inlet aperture in fluid communication with the engine compartment and a second air outlet aperture in fluid communication with the air intake duct orifice, whereby air may be drawn from the engine compartment along the second flow path to the air intake duct.

In the event that the first air inlet aperture of first flow path becomes blocked temporarily, for example if the front of the vehicle is submerged during wading, air may be drawn from the engine compartment to prevent the engine from being starved of intake air.

The first flow path may be provided by a bonnet air intake conduit, the air inlet aperture being provided at a front portion of the bonnet.

The engine air intake orifice may be defined by an engine air intake orifice member, and the vehicle may comprise a seal member arranged to form a seal between the first air outlet aperture to the air intake orifice member when the bonnet is in the closed position.

The vehicle may comprise a further seal member arranged to form a seal between engine compartment and the bonnet, when the bonnet is in the closed position.

The second flow path may comprise a valve member movable between an open and closed position for permitting or restricting the flow of air therepast.

The vehicle may comprise driver selectable switching means for moving the valve member between the open and closed positions.

The valve member may be operable to move between from the closed to the open position in response to a signal output from at least one sensor for detecting that the vehicle is wading or about to commence wading. The vehicle may have a moisture sensor for defecting the presence of water at a predetermined position on the vehicle.

Within the scope of this application it is expressly intended that the various aspects, embodiments examples and alternatives set out in the preceding paragraphs. In the claims and/or in the following description and drawings, and in particular the individual features thereof, may be taken independently or in any combination. For example, features described in connection with one embodiment are applicable to all embodiments, except where such features are incompatible.

BRIEF DESCRIPTION OF THE DRAWINGS

Embodiments of the invention will now be described, by way of example only, with reference to the accompanying figures in which:

FIG. 6 is a cross-sectional view along line A-A of FIG. 5.

DETAILED DESCRIPTION

Figure 1:
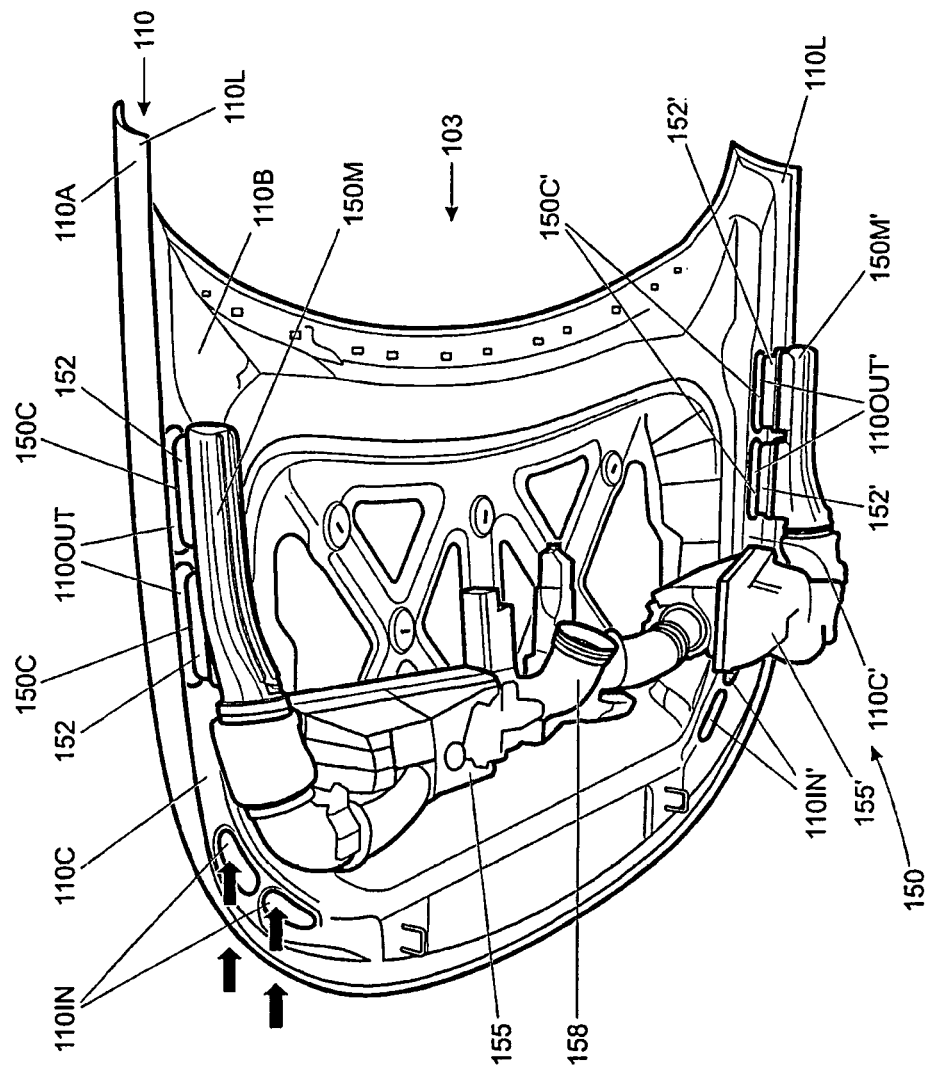
FIG. 1 is a schematic illustration of a bonnet and engine air intake duct assembly of a vehicle according to an embodiment of the present invention.
Figure 4:
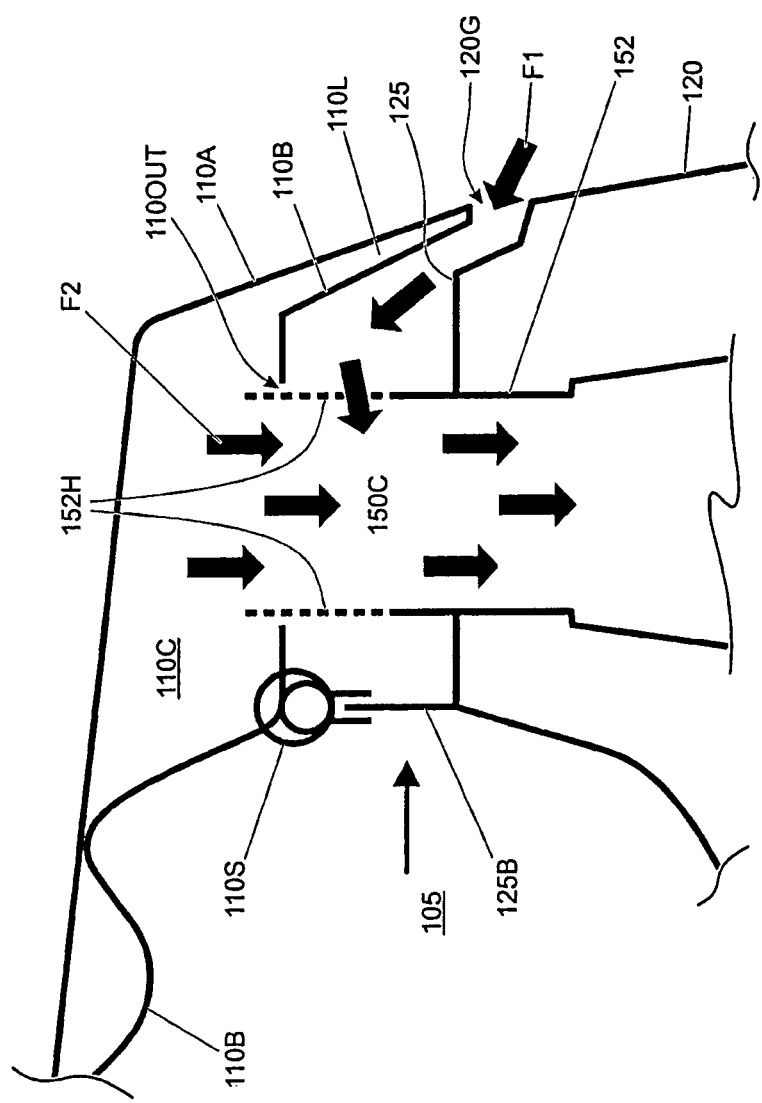
FIG. 4 is a cross-sectional view along X-X of FIG. 3.

FIG. 1 shows a portion of a vehicle having an air intake arrangement 103 according to an embodiment of the present invention. The vehicle has a bonnet 110 providing a closure member for an engine compartment 105 (FIG. 4). The bonnet 110 is formed from an external panel (or 'A' panel) 110A and an internal panel (or panel) 110B. The external and internal panels 110A, 110B are joined together by welds although other joining technologies are also useful. When joined to the external panel 110A, the internal panel 110B is shaped in such a manner as to define a pair of air conduits 110C, 110C' on respective left and right sides of the bonnet 100 (as viewed from a cockpit of the vehicle). In some alternative embodiments only one air conduit is provided rather than two although more than two air conduits may be provided in some embodiments.

Each conduit 110C, 110C' has a pair of air inlet apertures 110IN, 110IN' at a respective front corner of the bonnet 110 and a pair of air outlet apertures 110OUT, 110OUT' aft of the front corner towards a rear of the bonnet 110. Again, other numbers of inlet apertures and other numbers of outlet apertures are also useful. The inlet apertures 110IN, 110IN' are arranged to allow air to be drawn into the respective conduits 110C, 110C'. The outlet apertures 110OUT, 110OUT' are arranged to allow air drawn through the inlet apertures 110IN, 110IN' to be supplied to an engine intake duct assembly 150. A flow path of air through the bonnet air conduits 110C, 110C' to the intake duct assembly 150 may be referred to as a first flow path of air, F1.

The intake duct assembly 150 is in the form of a substantially symmetrical assembly of components for drawing 'dirty' (unfiltered) air through respective left and right intake turrets 152, 152' thereof to an engine of the vehicle. Air passing through a respective intake aperture member 152, 152' enters a respective left and right intake air manifold 150M, 150M'. Air is subsequently directed to flow through a respective left and right air filter box 155, 155' to a common clean (filtered) engine intake air supply line 158.

Figure 2:
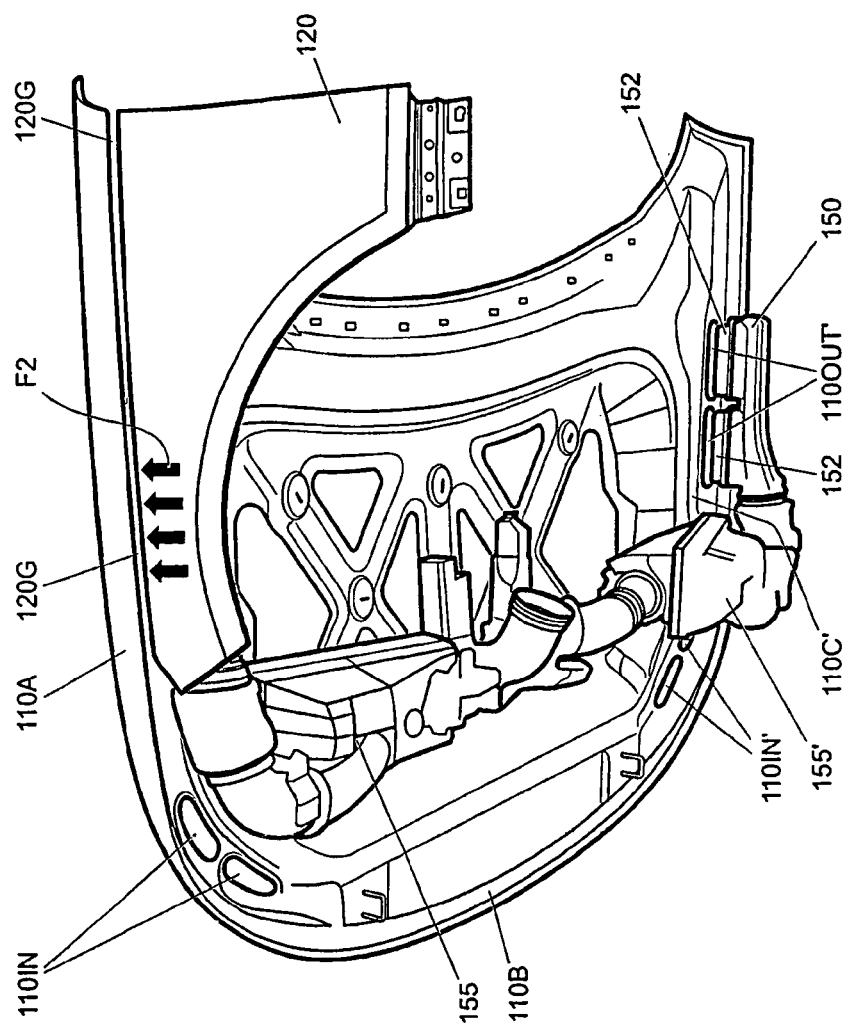
FIG. 2 shows the bonnet and intake duct assembly of FIG. 1 and in addition a wing panel of the vehicle.
Figure 3:
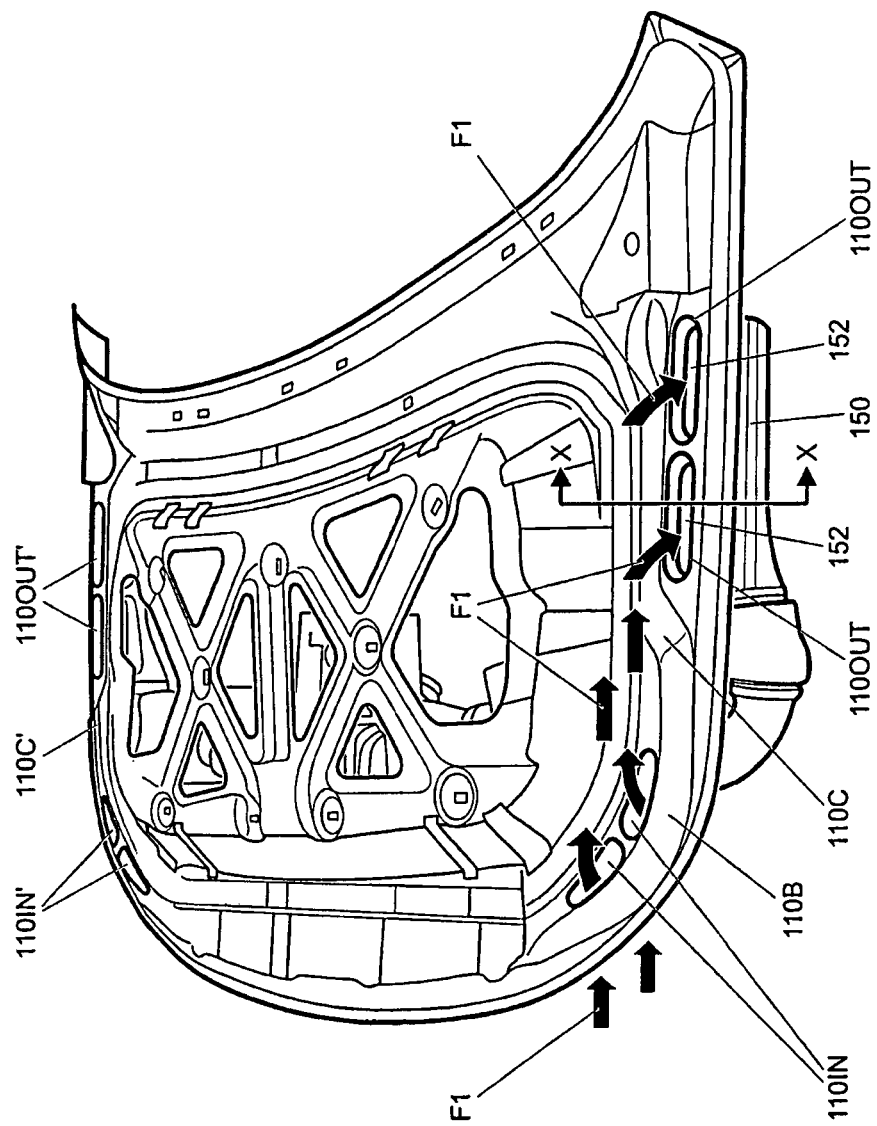
FIG. 3 shows the bonnet and intake duct assembly of FIG. 1 from above with an external panel of the bonnet removed for clarity.

FIG. 2 is similar view to that of FIG. 1 except that a wing panel is shown in addition. FIG. 3 is a side view of the internal bonnet panel 110B from above showing the first flow path F1 of air through the left-hand bonnet air conduit 110C.

FIG. 4 is a cross-sectional view of a portion of the vehicle along line X-X of FIG. 3. It can be seen from FIG. 4 that the intake aperture members or intake turrets 152, 152' are coupled to respective left and right structural members 125 of the vehicle to which left and right wing panels 120 are also coupled. Left and right front suspension struts are also coupled to the respective left and right support members 125.

In the embodiment shown the bonnet 110 is of the clamshell type, having a downwardly depending lip 110L provided around an outer peripheral edge of the bonnet 110. With the bonnet 110 in a closed condition a gap 120G is provided between a lower edge of the lip 110L and the body, in the present embodiment the gap is around 6 mm in width although other arrangements are also useful. It is to be understood that other bonnet types are also useful.

Inboard of the lip 110L of the bonnet 110 but outboard of the engine compartment 105, above the intake turrets 152, 152' is provided a convergence volume or region 150C, 150C'. Air drawn through respective air conduits 110C, 110C' is drawn into the convergence region 150C, 150C' and subsequently through a respective intake aperture member 152, 152'.

As shown in FIG. 4 air may also be drawn into the convergence regions 150C, 150C' and thereby into respective intake turrets 152, 152' through the gap 120G between the bonnet 110 and respective left and right wing panels 120. That is, a leak path exists for air into the intake turrets 152, 152' from around the intake turrets 152, 152' and not just from the bonnet air conduits 110C, 110C'. Such a flow path of air may be referred to as a second flow path and is illustrated by arrows F2 in FIG. 2 and FIG. 4. The convergence regions 150C, 150C' are therefore regions in which an air flow path through a respective bonnet air conduit 110C, 110C' converges with an air flow path through a gap 120G between the bonnet 110 and a respective left and right wing panel 120.

The presence of the second flow path has the advantage that if the conduits 110C, 110C' become blocked, for example by immersion in water during a wading operation, air may still be supplied to the convergence regions 150C, 150C'. The conduits 110C, 110C' may become blocked for example when the vehicle enters water nose first, such that a front portion of the bonnet 110 becomes submerged in water.

The precise location of the convergence regions 150C, 150C' may be determined to meet requirements in respect of packaging of one or more components of the air duct assembly 150 and factors such as a maximum wading depth and maximum angle of entry of the vehicle into water, so as to prevent ingress of water into the intake turrets 152, 152' during wading operations. Other arrangements are also useful.

As shown in FIG. 4, the intake turrets 152, 152' protrude upwardly above their respective support members 125 such that air flowing through the gap 120G towards one of the convergence regions 150C, 150C' is forced to rise upwardly above the support member 125 before entering the respective convergence region 150C, 150C'. This feature has the advantage of reducing a risk that particles entrained in the flow of air through the gap 120G are drawn through the intake turrets 152, 152' and thereby into the intake duct assembly 150. Rather, it is found that entrained particles such as water droplets and snow flakes are instead blown rearwardly away from the inlet aperture members 152, 152' before the particles are able to pass through an inlet aperture member 152, 152'.

Furthermore, water droplets and snow flakes are prevented from accumulating around the intake turrets 152, 152' thereby blocking the second flowpath of air to the intake turrets 152, 152'.

The fact that the intake turrets 152, 152' protrude upwardly above their respective support members 125 has the further advantage of reducing a risk that water enters an intake aperture member 152, 152' during a wading operation.

In the embodiment shown in FIG. 4 a vertical gap exists between the bonnet air conduit outlet apertures 110OUT, 110OUT' and intake turrets 152, 152', whereby air travelling along the first flow path is required to exit a bonnet air conduit 110C, 110C' before entering an intake aperture member 152, 152'. In some alternative embodiments the intake turrets 152, 152' are arranged to protrude upwardly into the air outlet apertures 110OUT, 110OUT' of the respective bonnet air conduits 110C, 110C'. In one embodiment, the intake turrets 152, 152' protrude upwardly into the bonnet air conduit outlet apertures 110OUT, 110OUT' substantially as shown in dashed outline at 152H in FIG. 4. The height of the intake turrets 152, 152' may be selected so as to obtain a desired balance of air flow through the turrets 152, 152' along the first and second flow paths F1, F2 respectively.

It is to be understood that in embodiments in which the intake turrets 152, 152' protrude through the respective air outlet apertures 110OUT, 110OUT', the convergence regions 150C, 150C' may be provided at least partially within the respective air conduits 150C, 1500'. This feature has the advantage of further reducing a risk that any droplets of water or flakes of snow entrained in intake air are drawn through an intake aperture member 152, 152' and into the air duct assembly 150.

As shown in FIG. 4 the support member 125 Is provided with a baffle wall 125B along an inboard edge thereof. The baffle wall 125B rises to meet the bonnet 110 when the bonnet 110 is in the closed position. A seal member 110S is provided between the internal panel 110B of the bonnet 110 and the baffle wall 125B. The purpose of the seal member 110S is to prevent flow of air from the engine compartment 105 into the convergence region 150C, 150C'. Air within the engine compartment 105 is therefore prevented from entering the intake duct assembly 150. Thus only relatively cool ambient air is able to enter the intake duct assembly 150.

As described above, when the bonnet 110 is in a closed condition a gap 120G is provided between the bonnet 110 and a wing panel 120 of the vehicle. The gap 120G is sufficiently wide to allow ambient air to be drawn through the gap 120G and into a convergence region 150C, 150C'. Furthermore, the gap 120G is sufficiently wide to prevent water such as rainwater from blocking the gap 120G when the vehicle is operating in wet conditions. Thus for example if the vehicle is operating in rain, the gap 120G is sufficiently wide that rainwater flowing over the bonnet 110 across the gap 120G does net prevent air from being drawn through the gap 120G. The gap 120G is also of a width sufficiently large to reduce a risk that excessive amounts of rainwater are drawn into a convergence region 150C, 150C' by the flow of air through the gap 120G.

Figure 5:
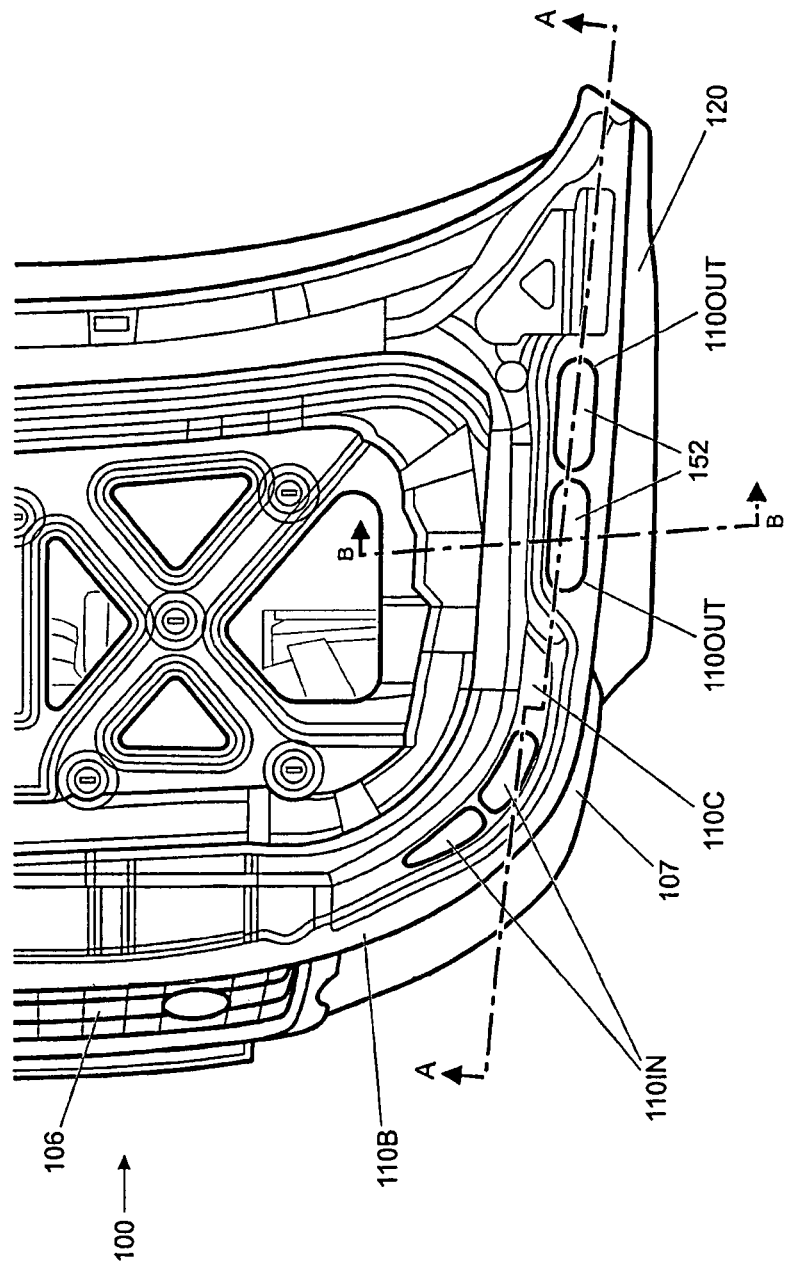
FIG. 5 is a plan view of a vehicle according to an embodiment of the invention showing a front left portion of the vehicle with an external panel of the bonnet removed.

FIG. 5 is plan view of a front left portion of a vehicle 100 according to an embodiment of the invention of which portions are shown in FIG. 1 to 4. The external panel 110A (FIG. 1) of the bonnet 110 of the vehicle 100 has been removed in order to expose the internal panel 110B.

FIG. 6 is a cross-sectional view of the front portion of the vehicle 100 along line A-A of FIG. 5.

As can be seen from FIG. 5 and FIG. 8, the air inlets 110IN of the bonnet 110 are provided immediately aft of a left-hand lighting cluster 107 of the vehicle 100. The right hand front portion of the vehicle 100 (not shown in FIG. 5) is arranged in a substantially symmetrical manner in so far as the air inlets 110IN and lighting cluster 107 are concerned.

It is to be understood that in some alternative arrangements the air inlets 110IN, 110IN' may be arranged to draw air through a front grille 106 of the vehicle 100 in addition to or instead of through a gap between the bonnet and a lighting cluster. The front grille may be a central front grille 106 arranged to direct ram air through a radiator pack of the vehicle 100. Other grille arrangements are also useful. In some embodiments the air inlets 110IN, 110IN' may be arranged to draw air through a respective dedicated one or more grilles. A grille through which air may be supplied to an air inlet 110IN, 110IN' may be arranged to direct air specifically towards an air inlet 110IN, 110IN'. For example in some embodiments a grille may be arranged to direct at least a portion of air flowing through the grille towards an air inlet 110IN, 110IN'. In some embodiments an upper region or portion of a grille may be arranged to direct air into an air inlet 110IN, 110IN'. In embodiments in which a dedicated grille is provided the grille may be arranged to direct substantially all of the air flowing through the grille into an air inlet 110IN, 110IN'. A grille may be arranged to deflect air in an upward direction to an air inlet 110IN, 110IN'.

In some embodiments the bonnet is provided with a sound reducing portion in the form of a Helmholtz resonator arrangement. The Helmholtz resonator arrangement may be configured to dampen sound associated with passage of air along the first flow path through the bonnet air conduits 110C, 110C'. In some arrangements a resonator cavity is defined by the external and internal bonnet panels 110A, 110B thereby to absorb acoustic energy created by flow of air along the first flow path. Other arrangements are also useful.

It is to be understood that embodiments of the present invention have the advantage that air may be drawn into an air intake duet arrangement 150 from a plurality of air sources without a requirement to provide an aperture in one or more external panels of the vehicle 100. Rather, air may be drawn into the intake duct arrangement 150 through a gap 120G between the bonnet 110 and a body of the vehicle 100 such as a gap 120G between the bonnet 110 and a wing panel or a gap 120G between the bonnet 110 and a lighting cluster 107.

Some embodiments of the present invention have the advantage that a styling of a vehicle may be designed without a requirement to incorporate engine air intake duct apertures in one or more panels of the vehicle such as a bonnet, a wing, a bumper fascia or any other panel. Furthermore, some embodiments of the invention have the advantage that an engine intake air assembly may be provided with an intake orifice that is arranged to draw intake air from a relatively high position below a bonnet of the vehicle. Thus a maximum depth of water in which a vehicle may wade may be increased relative to know intake air orifice locations.

As mentioned previously, the conduits 110C, 110C' may become blocked by immersion in water during a wading operation. It will often be the case that the conduits 110C, 110C' are only blocked temporarily, e.g. during commencement of the wading operation and particularly so it the vehicle enters the water on a downhill slope such that the angle of inclination of the vehicle bonnet relative to the surface of the water is increased. This is because the maximum wading depth of the vehicle will typically fee less than the height of the air inlet apertures 110IN, 110IN' (when the vehicle is on level ground). Furthermore, once the vehicle is moving forward through the water, a bow wave is created in front of the vehicle which reduces the height of the water in the vicinity of the air inlet apertures 110IN, 110IN' such that the conduits are not flooded.

In one embodiment of the invention, in order to prevent the engine from being starved of intake air for the period when the air inlet apertures 110IN, 110IN' are submerged, the second flow path is provided between the engine compartment 105 and each respective air intake turret 152, 152', to allow air to be drawn from the engine compartment when the air inlet apertures 110IN, 110IN' of the first flow path are blocked. For example, the second flow path may be provided by a duct or conduit (not shown) having an air inlet aperture in the baffle wall 125B and an air outlet aperture formed in an adjacent side wall of the respective air intake turret 152, 152'. In this case, each air intake turret 152, 152' may be sealed against the respective air outlet aperture 110OUT, 110OUT' when the bonnet 110 is closed, such that air passing through the gap 120G between the wing panel 120 and the bonnet 110 is not permitted to enter the convergence volume 150C, 150C'. Accordingly, the risk of water, snow or dust entering the engine air intake via the gap 120G between the wing panel 120 and the bonnet 110 reduced.

Although the air drawn from the engine compartment 105 is not fresh air and will have been warmed by heat from the engine, it is sufficient to prevent the engine from being starved of intake air during a temporary blockage of the first flow path. Furthermore, the vehicle will typically be travelling only very slowly as it enters water and commences wading, so the demand for intake air will be relatively low.

A valve member (not shown) may be provided to close the second flow path and prevent air from the engine compartment 105 entering the air intake turrets 152, 152' when the vehicle is not wading, such that air is only drawn from the engine compartment 105 when strictly necessary. A valve member may be disposed in each air intake turret 152, 152'. In addition to opening to allow air to be drawn in from the engine compartment 105, each valve member may also be arranged to simultaneously close off the adjacent air outlet aperture 110OUT, 110OUT' of the respective bonnet air intake conduits 110C, 110C' thereby reducing the risk that liquid will be drawn into the engine air intake along the first flow path when the air inlet apertures 110IN, 110IN' are submerged. The opening and closing of the valve member may be controlled by a switch operable by the driver. Alternatively, the valve may open and close automatically in response to a signal output from one or more sensors operable to detect when the vehicle is in or about to enter water. For example, the valve member may open in response to signals from moisture sensors positioned adjacent to each of the air inlet apertures 110IN, 110IN' indicating that one or both of them has been submerged. Alternatively, sensors such as wing mirror mounted parking sensors may be used to determine the presence and depth of water around the vehicle.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A motor vehicle comprising:
   a vehicle body;
   an engine compartment housing an engine;
   a bonnet movably coupled to the body and arranged to provide a closure member for the engine compartment, the bonnet being movable between open and closed conditions to allow access to the engine compartment; and
   an engine air intake duct having an orifice through which intake air may be drawn into the engine,
   wherein the vehicle is provided with first and second air flow paths whereby air may be supplied to the air intake duct,
   the first flow path comprising an air inlet aperture disposed at a front portion of the vehicle for receiving ram air and an air outlet aperture aft of the air inlet aperture, the air outlet aperture being provided in fluid communication with the air intake duct orifice;
   the second flow path being provided by a gap between a side edge of the bonnet and the body of the vehicle, whereby ambient air may be drawn into the air intake duct along the second flow path from the gap.

2. A vehicle as claimed in claim 1, the first flow path being provided by a bonnet air intake conduit, the air inlet aperture being provided at a front portion of the bonnet.

3. A vehicle as claimed in claim 2 arranged wherein the air inlet of the bonnet air intake conduit is arranged to draw air passing through a gap between the bonnet and a front portion of the body of the vehicle.

4. A vehicle as claimed in claim 3 wherein the air inlet of the bonnet air intake conduit is arranged to draw air passing through a gap between the bonnet and a front lighting cluster of the body of the vehicle.

5. A vehicle as claimed in claim 2 provided with a front grille for receiving ram air during travel in a forward direction, the air inlet of the bonnet air intake conduit being in fluid communication with air received through the front grille.

6. A vehicle as claimed in claim 5 arranged to divert at least a portion of ram air passing through the front grille upwards into the air inlet of the bonnet air intake conduit.

7. A vehicle as claimed in claim 2 wherein the air intake orifice of the engine air intake duct is arranged to face in a substantially upward direction thereby to receive air flowing downwardly from the bonnet air intake conduit, a leak path being provided between the bonnet air intake conduit outlet aperture and the air intake orifice thereby to allow air flowing along the second flow path to pass through the air intake orifice.

8. A vehicle as claimed in claim 2 wherein the engine air intake orifice is defined by an engine air intake orifice member, the intake orifice member being arranged wherein air flowing along the second flow path that has passed through the gap between the side edge of the bonnet and the body of the vehicle is required to rise upwardly before being drawn through the orifice.

9. A vehicle as claimed in claim 8 wherein the intake orifice member is arranged to protrude upwardly into the bonnet air conduit outlet aperture whereby air flowing along the second flow path is required to pass through the bonnet air conduit outlet aperture before entering the intake orifice member.

10. A vehicle as claimed in claim 2 wherein the engine air intake orifice is provided in fluid isolation from the engine compartment.

11. A vehicle as claimed in claim 10 wherein seal means is provided at a location between the air intake orifice and the engine compartment thereby to prevent flow of air from the engine compartment to the air intake orifice.

12. A vehicle as claimed in claim 2 wherein the bonnet air intake conduit is defined by respective external and internal panels of the bonnet, the external and internal panels being coupled together thereby to define the conduit therebetween.

13. A vehicle as claimed in claim 12 wherein the air inlet of the bonnet air intake conduit and the air outlet of the bonnet air intake conduit are defined by the internal panel.

14. A vehicle as claimed in claim 2 further comprising a resonator arrangement for absorbing acoustic energy generated as air flows along the first flow path through the bonnet air conduit.

15. A vehicle as claimed in claim 14 wherein the resonator arrangement comprises a Helmholtz resonator.

16. A vehicle as claimed in claim 14 wherein the bonnet comprises the resonator arrangement.

17. A vehicle as claimed in claim 16, wherein the bonnet air intake conduit is defined by respective external and internal panels of the bonnet, the external and internal panels being coupled together thereby to define the conduit therebetween, and wherein the resonator arrangement is defined by one or both of the internal and external panels.

18. A vehicle as claimed in claim 2 comprising a pair of air intake duct orifices located on respective opposite sides of the engine compartment, the bonnet providing a corresponding pair of bonnet air intake conduits.

19. A vehicle as claimed in claim 2 wherein the bonnet is a clamshell bonnet.

20. A motor vehicle comprising:
a vehicle body;
an engine compartment housing an engine;
a bonnet movably coupled to the body and arranged to provide a closure member for the engine compartment, the bonnet being movable between open and closed conditions to allow access to the engine compartment; and
an engine air intake duct having an orifice through which intake air may be drawn into the engine,
wherein the vehicle is provided with first and second air flow paths whereby air may be supplied to the air intake duct,
the first flow path comprising a first air inlet aperture disposed at a front portion of the vehicle for receiving ram air and a first air outlet aperture aft of the first air inlet aperture, the first air outlet aperture being provided in fluid communication with the air intake duct orifice;
the second flow path comprising a second air inlet aperture in fluid communication with the engine compartment and a second air outlet aperture in fluid communication with the air intake duct orifice, whereby air may be drawn from the engine compartment along the second flow path to the air intake duct; and
the vehicle is further provided with a valve member movable between an open position and a closed position, the valve being arranged to restrict the supply of air from the second flow path to the air intake duct when in the closed position, and to both permit the supply of air from the second flow path to the air intake duct and restrict the supply of air from the first flow path to the air intake when in the open position.

21. A vehicle as claimed in claim 20, the first flow path being provided by a bonnet air intake conduit, the air inlet aperture being provided at a front portion of the bonnet.

22. A vehicle as claimed in claim 21, the engine air intake orifice being defined by an engine air intake orifice member, and comprising a seal member arranged to form a seal between the first air outlet aperture to the air intake orifice member when the bonnet is in the closed position.

23. A vehicle as claimed in claim 20, comprising a further seal member arranged to form a seal between the engine compartment and the bonnet, when the bonnet is in the closed position.

24. A vehicle as claimed in claim 20, wherein the second flow path comprises the valve member.

25. A vehicle as claimed in claim 20, comprising driver selectable switching means for moving the valve member between the open and closed positions.

26. A vehicle as claimed in claim 20 wherein the valve member is operable to move from the closed to the open position in response to a signal output from at least one sensor for detecting that the vehicle is wading or about to commence wading.

27. A method of providing intake air to an engine of a motor vehicle comprising:
drawing air into an engine via an orifice of an air intake duct along first and second flow paths,
whereby air flowing along the first flow path flows through an air intake conduit of a bonnet of the vehicle, the bonnet air intake conduit having an air inlet aperture at a front portion of the bonnet and an air outlet aperture aft of the air inlet aperture through which the air is drawn, the air outlet aperture being in fluid communication with the air intake duct orifice,
and whereby fluid flowing along the second flow path is arranged to flow through a gap between a side edge of the bonnet and the body of the vehicle, whereby ambient air may be drawn into the air intake duct along the second flow path from the gap.

* * * * *